(12) United States Patent
Kuscher et al.

(10) Patent No.: US 9,720,571 B2
(45) Date of Patent: *Aug. 1, 2017

(54) IMMERSIVE MODE FOR A WEB BROWSER

(71) Applicant: Google Inc., Mountain View, CA (US)

(72) Inventors: Alexander Friedrich Kuscher, San Francisco, CA (US); John Nicholas Jitkoff, Palo Alto, CA (US); Sebastien Vincent Gabriel, San Francisco, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/288,301

(22) Filed: May 27, 2014

(65) Prior Publication Data

US 2015/0007093 A1    Jan. 1, 2015

Related U.S. Application Data

(63) Continuation of application No. 13/929,698, filed on Jun. 27, 2013, now Pat. No. 8,775,965.

(51) Int. Cl.
     *G06F 3/0483*      (2013.01)
     *G06F 17/30*      (2006.01)
     (Continued)

(52) U.S. Cl.
     CPC .......... *G06F 3/0483* (2013.01); *G06F 3/0481* (2013.01); *G06F 3/0484* (2013.01); *G06F 3/04817* (2013.01); *G06F 17/30861* (2013.01)

(58) Field of Classification Search
     CPC ............. G06F 3/0484; G06F 17/30861; G06F 3/0483; G06F 3/0481; G06F 3/04817
See application file for complete search history.

(56) References Cited

U.S. PATENT DOCUMENTS

| | | |
|---|---|---|
| 5,305,435 A | 4/1994 | Bronson |
| 5,473,745 A | 12/1995 | Berry et al. |

(Continued)

OTHER PUBLICATIONS

Tabtiles, Examiner created screenshots of web page <https://chrome.google.com/webstore/detail/tabtiles/aaeapgfkbbbdpbfjmpcblemfajmkiddh#detail/tabtiles/aaeapgfkbbdfjmpcblemfajmkiddh>, created Sep. 2013.

(Continued)

*Primary Examiner* — Nicholas Ulrich

(74) *Attorney, Agent, or Firm* — McDermott Will & Emery LLP

(57) ABSTRACT

Various aspects of the subject technology relate to systems, methods, and machine-readable media for providing a light bar for a web browser in an immersive mode. A system is configured to display a web browser in a first browsing mode, wherein the browser in the first browsing mode comprises one or more tabs and receive, from a user, an indication to enter a second browsing mode for the web browser. In response to receiving the indication, the web browser may be displayed in the second browsing mode in which the one or more tabs are not shown. One or more light bars may also be displayed in a display area of the web browser at locations corresponding with the one or more tabs. Each of the one or more light bars is associated with one of the one or more tabs.

19 Claims, 7 Drawing Sheets

(51) Int. Cl.
*G06F 3/0481* (2013.01)
*G06F 3/0484* (2013.01)

(56) References Cited

U.S. PATENT DOCUMENTS

| | | | |
|---|---|---|---|
| 5,627,954 | A | 5/1997 | McFarland |
| 5,844,559 | A | 12/1998 | Guha |
| 6,023,272 | A | 2/2000 | Malamud et al. |
| 6,163,318 | A | 12/2000 | Fukuda et al. |
| 6,664,983 | B2 | 12/2003 | Ludolph |
| 7,194,691 | B1 | 3/2007 | Zilka et al. |
| 7,487,462 | B2 | 2/2009 | Good et al. |
| 8,200,962 | B1 | 6/2012 | Boodman et al. |
| 8,281,252 | B2 | 10/2012 | Kapanen et al. |
| 8,504,937 | B2 | 8/2013 | Jobs et al. |
| 2006/0161857 | A1 | 7/2006 | Johnston et al. |
| 2006/0277472 | A1* | 12/2006 | Yodo .................. G06F 3/04847 715/738 |
| 2011/0113337 | A1* | 5/2011 | Liu ....................... G06F 3/0483 715/727 |
| 2012/0066634 | A1 | 3/2012 | Kim et al. |
| 2012/0131519 | A1 | 5/2012 | Jitkoff |
| 2013/0073399 | A1* | 3/2013 | Celener Nijamkin .......................... G06Q 30/0241 705/14.73 |

OTHER PUBLICATIONS

Oowildcat, Use Chrome Full-Screen or on a Large Monitor? Check out my New Extension, <http://www.reddit.com/r/chrome/comments/11ov7b/use_chrome_fullscreen_or_on_a_large_monitor_check/>, Oct. 18, 2012

Orgera, How to Activate Full Screen Mode in Google Chrome for Windows, <http://browsers.about.com/od/googlechrome/ss/google-chrome-full-screen-mode.htm> retrieved using wayback machine <http://archive.org/web/web/php>, Sep. 2, 2010.

\* cited by examiner

FIG. 2

IMMERSIVE MODE FOR A WEB BROWSER

RELATED APPLICATION

This application is a continuation and claims the benefit of U.S. application Ser. No. 13/929,698 filed Jun. 27, 2013, the disclosure of which is entirely incorporated herein by reference.

BACKGROUND

The present disclosure generally relates to user interfaces and, in particular, to display modes in a web browser.

Web browsers are configured to load web pages for display in a display area of a browser. In some cases multiple web pages or may be loaded at the same time using browser tabs. For example, a web browser may have multiple tabs open and each tab may contain a loaded web page. For each web browser window, one of the tabs may be an active tab and the other tabs may be hidden or non-active tabs. The web page loaded in the active tab may be shown in the display area of the browser while the web pages loaded in the hidden tabs are not shown in the display area. Instead, to view those web pages, a user may select a hidden tab to make the selected tab the active tab so that the web page loaded in the selected tab may be shown in the display area of the browser. Some browsers or web pages may enable users to select a full-screen mode or immersive mode for a web browser where the contents of the active tab may be viewed in full-screen.

SUMMARY

Various aspects of the subject technology relate to a system for providing a light bar in a web browser during an immersive mode. The system may include one or more processors and a machine-readable medium comprising instructions stored therein, which when executed by the one or more processors, cause the one or more processors to perform operations. The operations include displaying a web browser comprising one or more browsing tabs, wherein the one or more browsing tabs comprise an active tab, receiving, from a user, an indication to enter an immersive mode for the web browser, displaying the web browser in the immersive mode in response to the indication, wherein the web browser in the immersive mode is displayed with content for the active tab displayed in full screen, and displaying, in a display area of the web browser in the immersive mode, one or more light bars at locations corresponding with the one or more browsing tabs, wherein each of the one or more light bars is associated with one of the one or more browsing tabs.

Other aspects of the subject technology relate to a method for providing a light bar in a web browser during an immersive mode. The method includes displaying a web browser in a first browsing mode, wherein the browser in the first browsing mode comprises one or more tabs, receiving, from a user, an indication to enter a second browsing mode for the web browser, displaying the web browser in the second browsing mode in response to the indication, wherein the web browser in the second browsing mode is displayed without the one or more tabs, and displaying, in a display area of the web browser in the second browsing mode, one or more light bars at locations corresponding with the one or more tabs, wherein each of the one or more light bars is associated with one of the one or more tabs.

Various aspects of the subject technology relate to a non-transitory machine-readable medium comprising instructions stored therein, which when executed by a machine, cause the machine to perform operations. The operations include displaying a web browser comprising one or more tabs, receiving, from a user, an indication to enter a full-screen mode for the web browser, displaying the web browser in the full-screen mode in response to the indication, and displaying one or more light bars associated with each of the one or more tabs, wherein the one or more light bars are displayed at locations in the display area corresponding with each of the one or more tabs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

FIG. 2 is an illustration of an example user interface showing a web browser in an immersive mode, in accordance with various aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

A web browser may be configured to allow a user to enter an immersive mode (e.g., a full-screen mode) for the web browser. When the web browser is in the immersive mode, the content of an active browser tab, which is typically a web page, is shown in the entire area of the web browser's display area. In some cases, this may be the entire web browser window or the entire screen of one or more monitors or displays. However, when the web browser is in the immersive mode, the tabs are not visible to the user. Accordingly, the user may not be aware of or have any visual indication of the number of tabs open, the location of the tabs, which tabs are active or hidden, or any other information other than the content of the active tab.

Various aspects of the subject technology relate to systems and methods for providing one or more light bars in the display area of a web browser while the web browser is in an immersive mode. The light bars are configured to provide a persistent visual indicator of the one or more tabs without taking much space in the display area of the web browser. The persistent visual indicators may allow a user to determine how many tabs are open without taking any action such as moving a cursor to a prescribed area to show hidden tabs. Furthermore, the light bars provide visual indicators that take up less space than the browser tabs that they replace.

Figure 1:
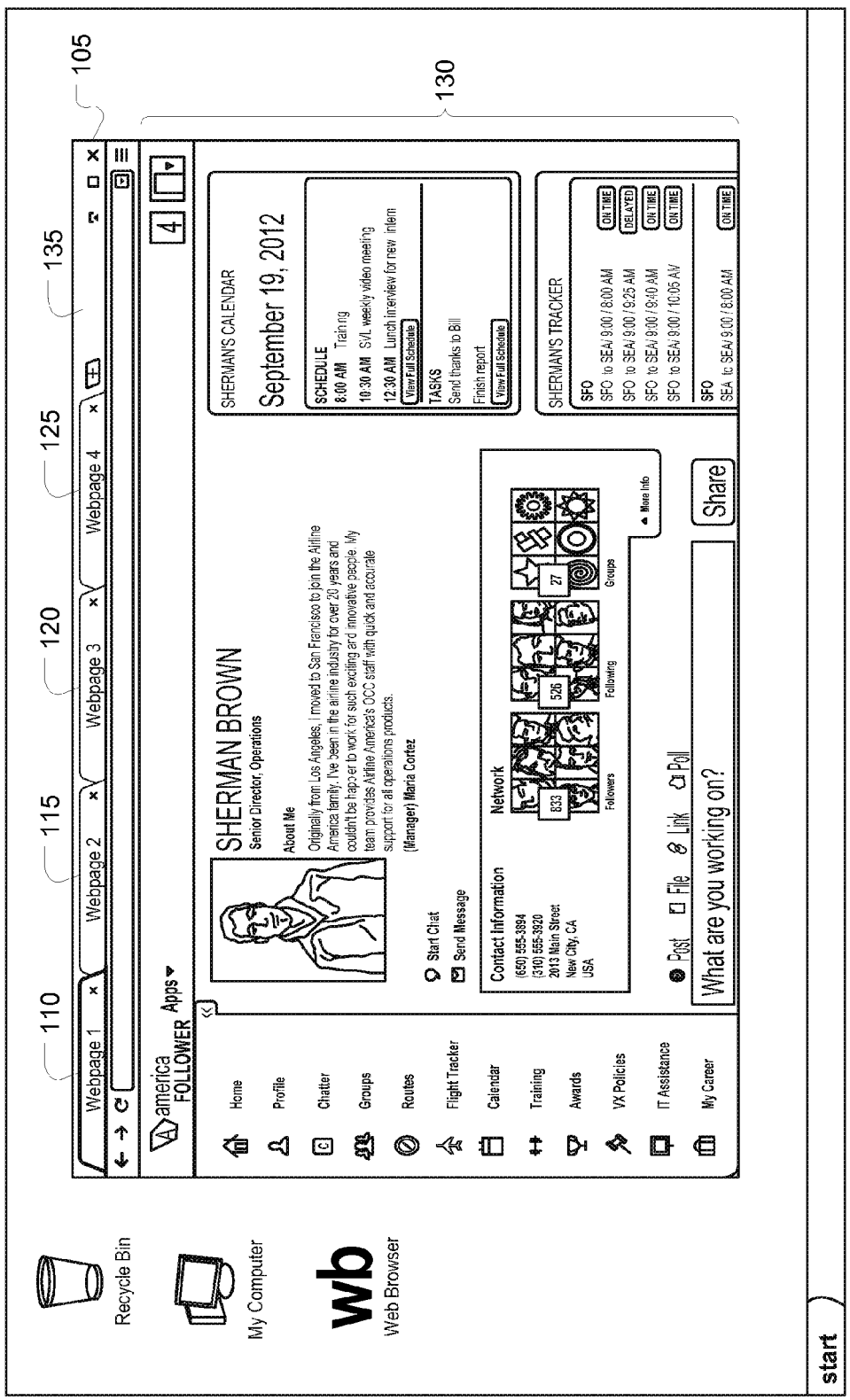
FIG. 1 is an illustration of an example user interface showing a web browser, in accordance with various aspects of the subject technology.

FIG. 1 is an illustration of an example user interface 100 showing a web browser 105, in accordance with various aspects of the subject technology. The user interface 100 may be a desktop, screen, or display provided by a device. The device may be, for example, a computer, a laptop, a tablet, a mobile phone, a mobile device, a smart television or screen, a display device, or any other machine associated with a display.

The web browser 105 may contain a number of browser tabs 110, 115, 120, and 125 that are shown in a non-display portion 135 of the web browser. The non-display portion 135 of the web browser 105 may be, for example, a tool bar, a ribbon, a border, or other portion of the web browser 105 that does not display the content of a browser tab. Each browser tab may contain content such as a web page, an image, a document, spreadsheet, a video, or any other content or media that may be loaded by a web browser 105. The browser tabs in the web browser 105 may be active or hidden.

For example, in FIG. 1, browser tab 110 is an active tab, while browser tabs 115, 120, and 125 are hidden tabs. The content contained in the active tab 110 may be shown in a display area 130 of the web browser 105 while the content loaded in the hidden tabs 115, 120, and 125 are not visible in the display area 130. If a user wishes to see the content loaded in one of the hidden tabs, the user can select the hidden tab to make the selected tab the active tab. Accordingly, the content contained in the selected tab will be shown in the display area 130.

The web browser 105 may also enable users to activate an immersive mode for the web browser in which the contents of the active tab enlarged to cover, for example, the entire web browser window 105 or the entire user interface 100. A user can activate the immersive mode by, for example, using a hot-key, activating a user interface element such as a button, typing in a command, using a gesture on a track pad, or by some other means.

Figure 2:
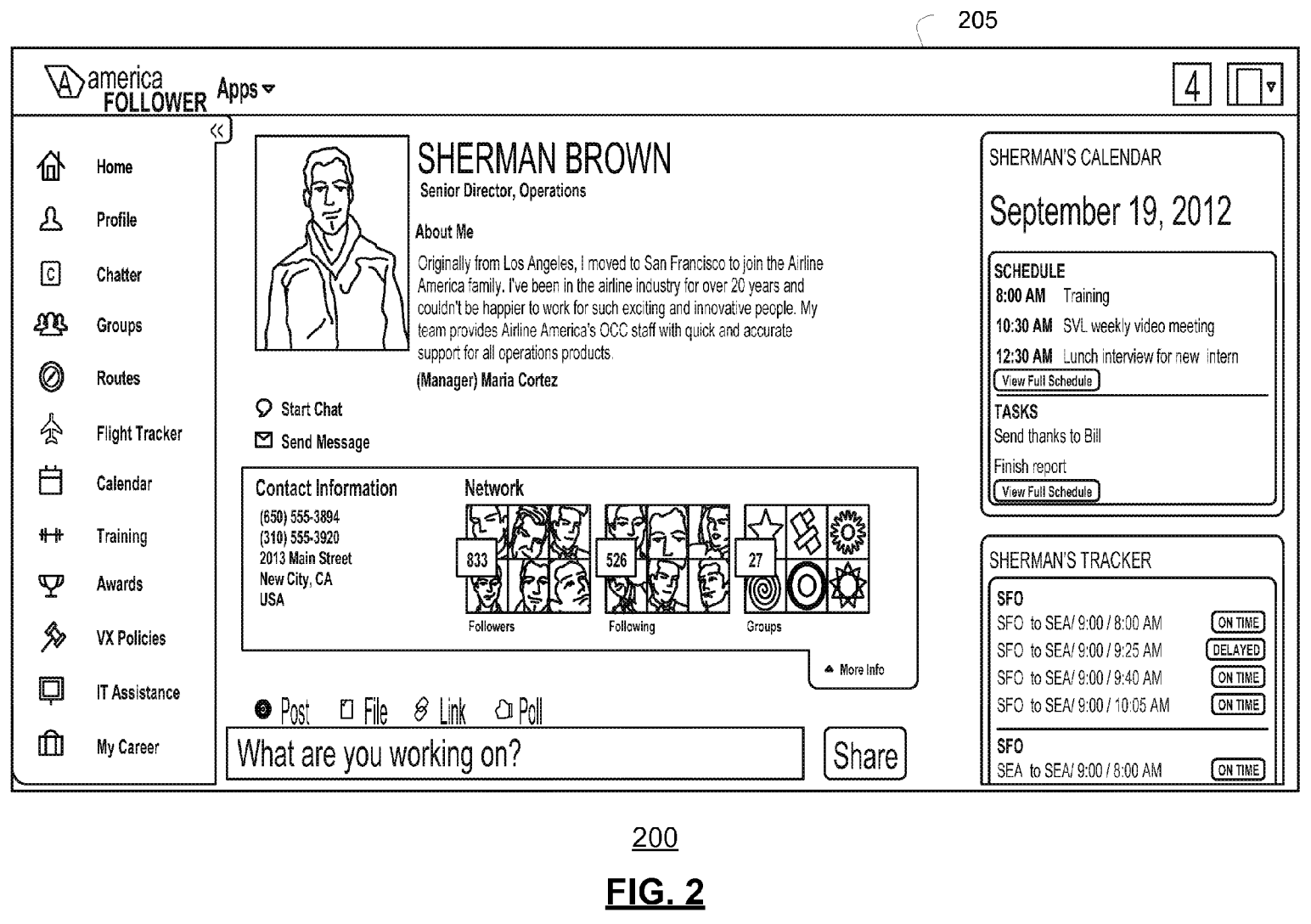

FIG. 2 is an illustration of an example user interface 200 showing a web browser in an immersive mode, in accordance with various aspects of the subject technology. The user interface 200 may be a desktop, screen, or display provided by a device or, in some aspects, the user interface 200 may be the browser window. As is shown in FIG. 2, the non-display portions of the web browser and the browser tabs are not visible when the web browser is in the immersive mode. Instead, display area 205 of the web browser and the contents of the active tab are expanded in the user interface 200. Accordingly, there are no visual indications of how many tabs are open, which tabs are active or hidden, or any other information other than the content of the active tab. Furthermore, there are no interface elements visible that the user can user to select another browser tab to switch the active browser tab.

Figure 3:
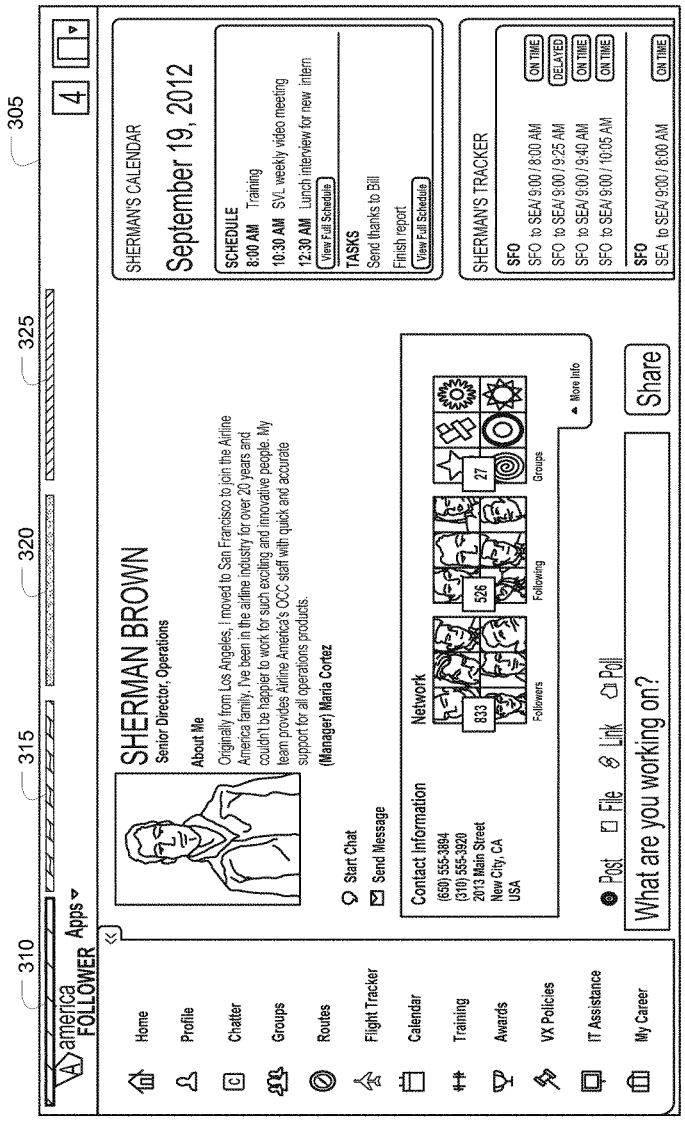
FIG. 3 is an illustration of another example user interface showing a web browser in an immersive mode, in accordance with various aspects of the subject technology.

FIG. 3 is an illustration of another example user interface 300 showing a web browser in an immersive mode, in accordance with various aspects of the subject technology. As seen with FIG. 3, the non-display portions of the web browser and the browser tabs are not visible during the immersive mode. Instead, display area 305 of the web browser and the contents of the active tab are expanded in the user interface 300. However, in FIG. 3, a system, such as the web browser running on a device, may be configured to provide for the display of light bars 310, 315, 320, and 325 in the display area 305. According to some aspects, the light bars 310, 315, 320, and 325 may be displayed at an edge of the display area 305, at the top of the display area 305, or near an edge of the display area 305 (e.g., at a predetermined offset distance away from the top edge of the display area 305).

The light bars 310, 315, 320, and 325 may provide a persistent visual indicator of the browser tabs of the web browser. Each of the light bars 310, 315, 320, and 325 is associated with one of the browser tabs of the web browser. The light bars 310, 315, 320, and 325 may be smaller, thinner, or take up less space on the user interface 300 than the browser tabs which they replace. For example, the light bars 310, 315, 320, and 325 may be 5 or less pixels in width.

Accordingly, they may be less distracting to a user or obscure less of the content of the active browser tab. According to some aspects, a user may select the light bar in order to activate the associated browser tab and make that browser tab the active browser tab. This may result in the display area 305 changing to the content of the browser tab associated with the selected light bar.

According to some aspects, the light bars 310, 315, 320, and 325 may be composed of one or more colors. The colors of the light bars may be default colors (e.g., a default color, a default color for an active tab, a default color for a hidden tab, etc.), colors selected based on the content of the tab, or a combination of these. In some cases, the colors may be selected based on an image or icon associated with a browser tab. For example, the icon may be a shortcut icon, a "favicon," a web site icon, a bookmark icon, a miniaturized image of the content of a browser tab, or any other image associated with the content of the browser tab. One or more colors for the light bar associated with the browser tab may be selected based on the dominant colors in the icon.

In some aspects, the light bars may have additional functionality. For example, each light bar may be configured to indicate states of web pages. A light bar may be configured to, for example, indicate when content (e.g., a web page) is loading, when content has finished loading, when an error has occurred, or if the tab is playing audio or video content. The light tab may indicate these stages by flashing or pulsing a particular color or combination of colors, turning a particular color, or becoming dimmer or brighter. For example, the light bar for a tab may be dimmed while the tab is loading content and become brighter when the content has finished loading. When there is an error associated with a tab, the light bar for the tab may be a default error color (e.g., bright red). When audio or video content is being played in a tab, the light bar for the tab may pulse a white light.

Figure 4:
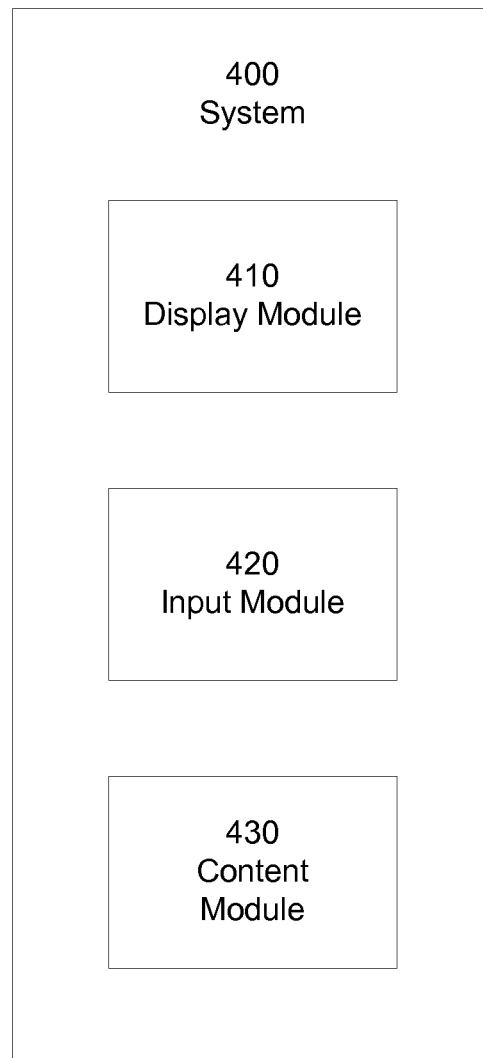
FIG. 4 is a block diagram illustrating an example system configured to provide a light bar in a web browser during an immersive mode, in accordance with various aspects of the subject technology.

FIG. 4 is a block diagram illustrating an example system 400 configured to provide a light bar in a web browser during an immersive mode, in accordance with various aspects of the subject technology. The system 400 may include a display module 410, an input module 420, and a content module 430. In other aspects, however, the system may include additional modules, alternative modules, or fewer modules.

The display module 410 is configured to provide the display functions of a web browser on a computing machine or device (e.g., a laptop, a tablet, a computer, a smart television, a smart phone, a mobile device, etc.). For example, the display module 410 is configured to display the web browser in all of its various browsing modes, the browsing tabs, the content loaded in an active browsing tab, and any other displayed interface of the web browser. The display module 410 may also be configured to display one or more light bars associated with the browsing tabs when the web browser is in immersive mode.

The input module 420 is configured to receive input from various sources such as, for example, a user. Inputs that may be received may include uniform resource locators (URLs) inputted by a user, instructions to open a link received from the user or another process or system, or indications to enter or exit various browsing modes such as an immersive browsing mode.

The content module 430 may be configured to load content in a browser display area for viewing. For example, the content module 430 may communicate with various resources over a network (e.g., the Internet) in order to obtain content (e.g., images, web pages, video, audio, files, etc.) so that the content may be displayed by the display module 410. In other aspects, the content may be accessed on a local hard drive or other memory in more direct communication with the system 400.

Figure 5:
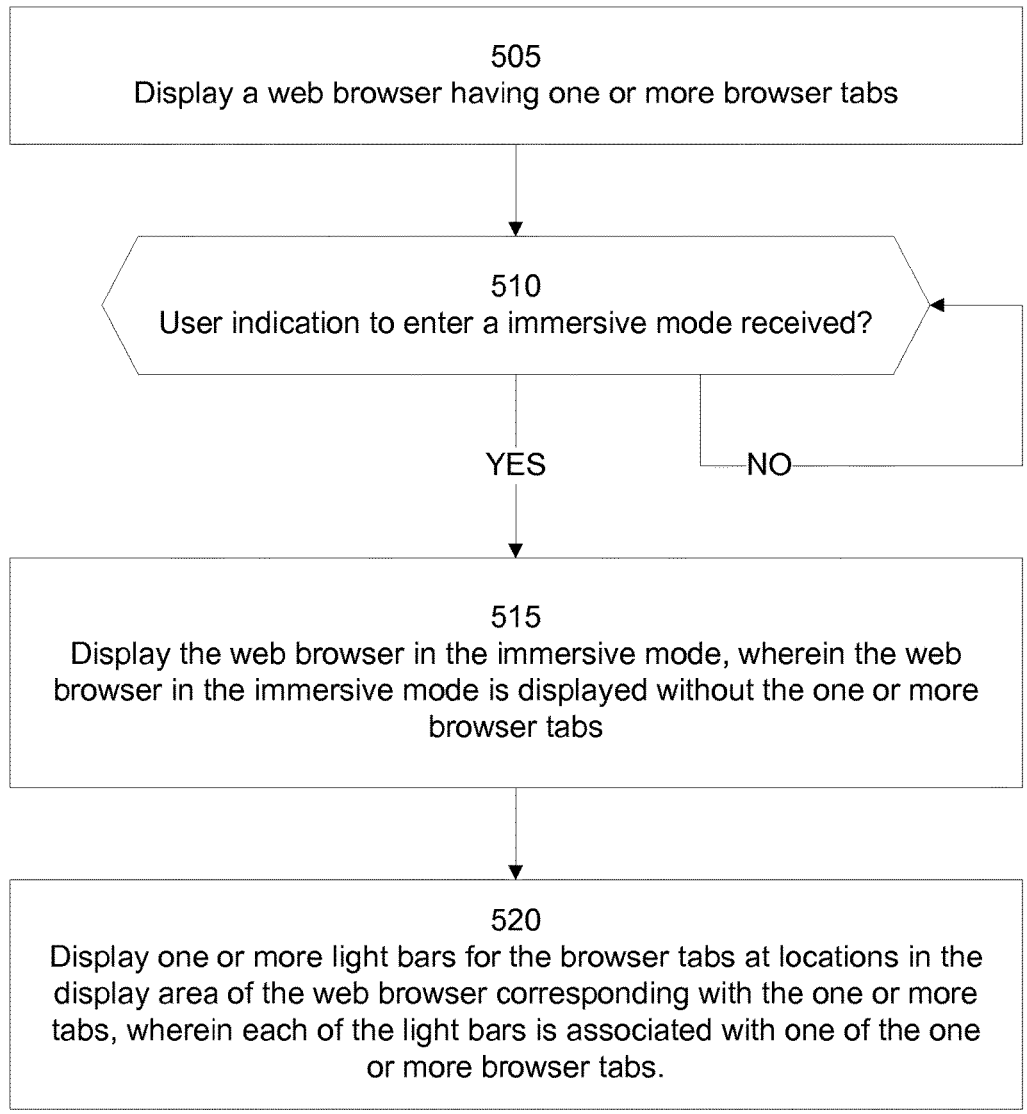
FIG. 5 is a flow chart illustrating an example process for providing a light bar in a web browser during an immersive mode, in accordance with various aspects of the subject technology.

FIG. 5 is a flow chart illustrating an example process 500 for providing a light bar in a web browser during an immersive mode, in accordance with various aspects of the subject technology. Although the process blocks of FIG. 5 are described with reference to the components of the system 400 in FIG. 4, the blocks are not limited to being performed by these components. In addition, although the blocks in process 500 are shown in a particular order, certain blocks may be executed in different orders or at the same time.

At block 505, the display module 410 may display a web browser having one or more browser tabs (e.g., an active browser tab and possibly one or more hidden browser tabs). The web browser may be displayed in a first browsing mode, such as a normal browsing mode where the browser tabs are in an area of the browser that does not display loaded content (e.g., a web page, an image, etc.) for the active browser tab. The area may be, for example, a tool bar, a ribbon, or a border of the web browser.

The input module 420 may determine whether a user indication to enter a second browsing mode, an immersive mode, has been received. The user indication may be received via a hot-key, a user interface element such as a button, using a gesture on a track pad, or through some other command or instruction. If a user indication has not been received, the browser may continue to operate in the first browsing mode.

If a user indication is received by the input module 420, the display module 410 may display the web browser in the second browsing mode (e.g., immersive mode) at block 515. When the web browser is in the immersive mode the display area of the web browser is expanded in the user interface of the web browser and contents of the active tab may appear full-screen. Furthermore, the browser tabs that are visible in the normal browsing mode are not shown in the immersive mode.

At block 520, the display module 410 may also display one or more light bars in the display area of the user interface. Each light bar displayed in the user interface may be associated with one of the browser tabs and may be displayed in a location corresponding to the browser tab. For example, the light bar displayed at the left-most position may be associated with the browser tab displayed the furthest left when the web browser was in normal browsing mode. The light bar displayed at the second to left-most position may be associated with the browser tab displayed the second to furthest left when the web browser was in normal browsing mode. The positions of the other light bars may similarly correspond to the browser tab that each light bar is associated with.

As mentioned above, the light bars displayed may be colored the same or differently. According to some aspects, the displaying of the light bars includes selecting one or more colors for each light bar and displaying the light bar in accordance to the selected color(s). In one implementation, the one or more colors for a light bar associated with a browser tab may be selected based on an image associated with the browser tab. For example, the image may be a miniaturized version of the content (e.g., the image, the web page, etc.) of the browser tab. In another example, the image may be an icon associated with the browser tab or the content of the browser tab. The icon may be a "favicon," a web site icon, or a bookmark icon.

To select one or more colors from the image, the display module 410 may generate a prioritized list of colors used in the image and select the most used or most dominant colors in the image. According to some aspects, generating the prioritized list of colors may include a number of image processing steps such as removing background colors (e.g., whitespace or other colors that serve as a background to the icon), grouping together similar colors, determining a weighted average color for each group of similar colors, and determining the portion of the image (e.g., the number of pixels) that correspond to each group of similar colors. The group of similar colors that is responsible for the biggest portion of the image may be assigned the highest priority and the color used for that group of colors may be the average color for that group of colors. The other colors in the prioritized list of colors may be similarly determined.

In some cases each light bar may include more than one color. For example, a portion of the light bar may be a first color and the rest of the light bar may be a second color. All of the colors for the light bar may be selected based on the image associated with the browser tab or only some of the colors may be based on the image. For example, the first portion of the light bar may be a color selected based on the image while the second color may be selected based on a default color or a characteristic of the browser tab.

In one aspect, the default color may be a predefined color (e.g., a shade of grey). There may also be multiple default colors based on the characteristic of the browser tab. For example, there may be one default color for active browser tabs and another default color for hidden browser tabs. Accordingly, a light bar for an active browser tab may include the default color for the active browser tab, while a light bar for a hidden browser tab may include the default color for the hidden browser tab.

Figure 6A:
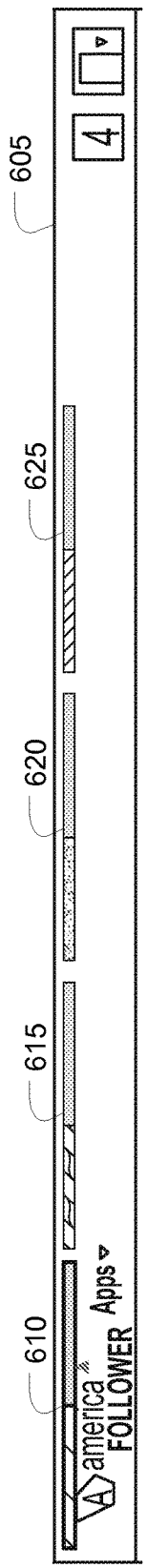
FIG. 6A and FIG. 6B are illustrations of portions of example user interfaces that include light bars, in accordance with various aspects of the subject technology.
Figure 6B:
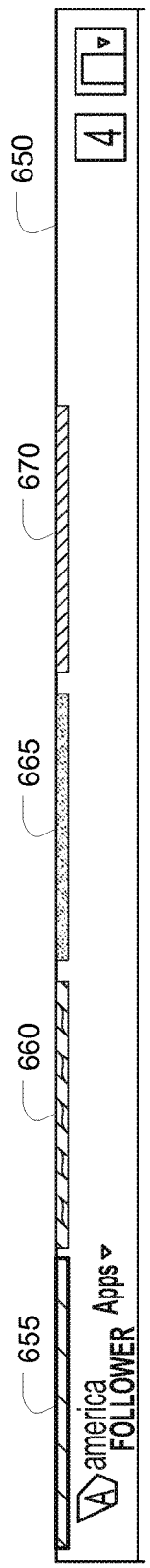

FIG. 6A and FIG. 6B are illustrations of portions of example user interfaces that include light bars, in accordance with various aspects of the subject technology. For example, in FIG. 6A, the user interface 605 includes light bars 610, 615, 620, and 625 that each include two colors or textures. Although FIG. 6A includes light bars that each contain only two colors, in other implementations, more colors or textures may also be may be used. Furthermore, the light bars included in the user interface may have a different number of colors or textures used than other light bars.

The light bars may also be placed in different locations in the user interface. For example, in FIG. 6A, the user interface 650 includes light bars 655, 660, 665, and 670 that are located at the topmost edge of the user interface 650. In other implementations, the light bars may be located at or near other edges (e.g., a right edge, a left edge, or a bottom edge). The light bars may also be arranged horizontally, vertically, or in other orientations.

Figure 7:
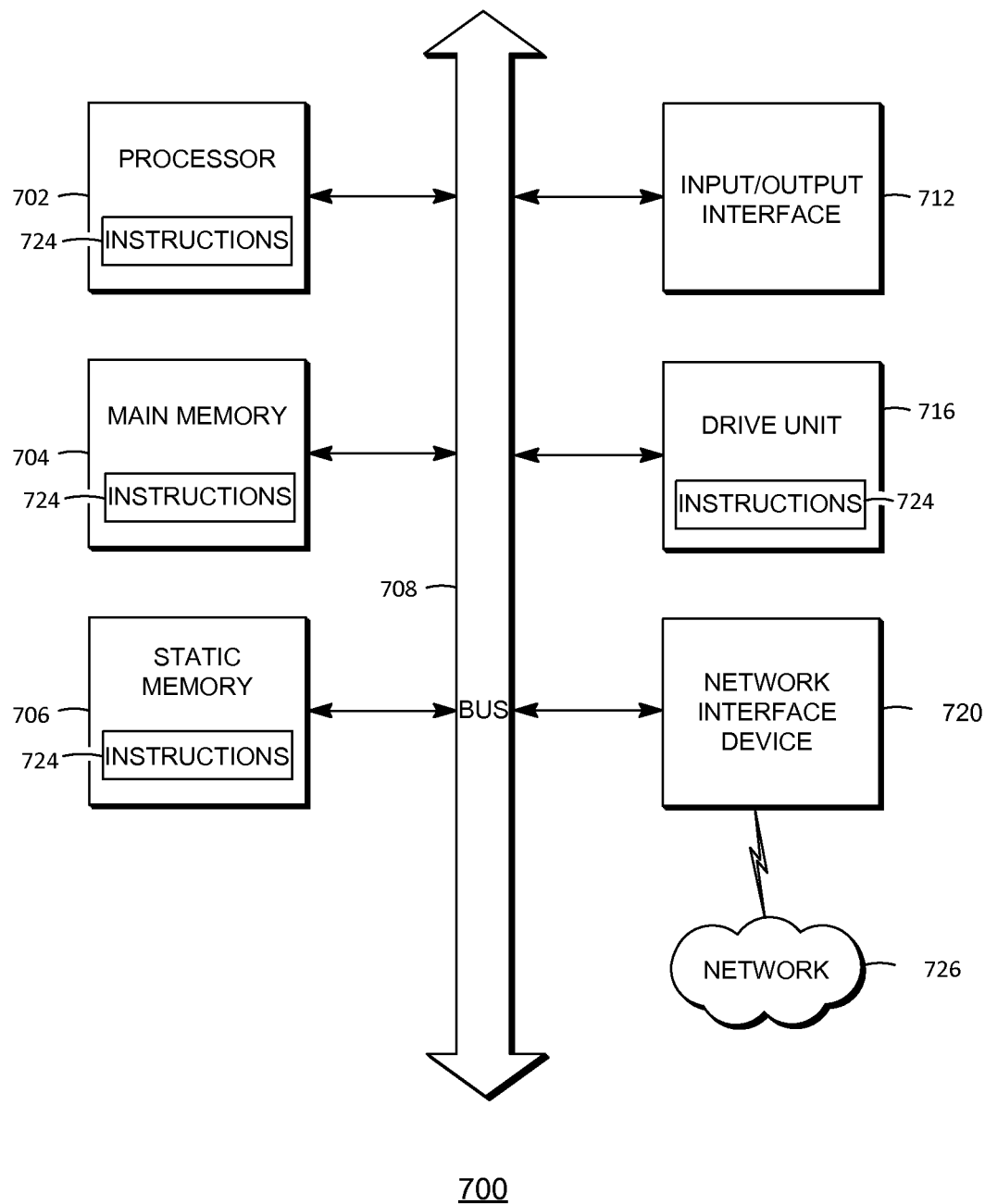
FIG. 7 is a block diagram illustrating an example computer system with which any of the computing machines, devices, or systems discussed herein may be implemented, in accordance with some aspects of the subject technology.

FIG. 7 is a block diagram illustrating an example computer system with which any of the computing machines, devices, or systems discussed herein may be implemented, in accordance with some aspects of the subject technology. In certain aspects, the computer system 700 may be implemented using hardware or a combination of software and hardware, either in a dedicated server, or integrated into another entity, or distributed across multiple entities.

The example computer system 700 includes a processor 702, a main memory 704, a static memory 706, a disk drive unit 716, and a network interface device 720 which communicate with each other via a bus 708. The computer system 700 may further include an input/output interface 712 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 702 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 724 embodying any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media. The instructions 724 may further be transmitted or received over a network 726 via the network interface device 720.

The machine-readable medium may be a single medium or multiple media (e.g., a centralized or distributed database, and/or associated caches and servers) that store the one or more sets of instructions. The machine-readable medium may include the drive unit 716, the static memory 706, the main memory 704, the processor 702, an external memory connected to the input/output interface 712, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   displaying a web browser in a first browsing mode, wherein the web browser in the first browsing mode displays an active tab and one or more hidden tabs, the active tab and the one or more hidden tabs being associated with respective web content;
   receiving an indication to enter a second browsing mode for the web browser; and
   upon entering the second browsing mode, replacing each of the active tab and the one or more hidden tabs with a light bar while displaying content for the active tab in full screen, each light bar indicating a property of web content associated with a tab replaced by each light bar, wherein each light bar comprises colored sections, one colored section is based on an icon associated with the tab corresponding to each light bar, and another colored section is based on a state of the tab corresponding to each light bar.

2. The computer-implemented method of claim 1, wherein the second browsing mode is an immersive mode for the web browser.

3. The computer-implemented method of claim 1, further comprising:
   displaying each light bar at a location corresponding to the tab replaced by each light bar.

4. The computer-implemented method of claim 3, further comprising:
   identifying an icon associated with the tab replaced by light bar; and
   determining at least one dominant icon color for the icon, wherein the at least one dominant icon color for the icon is selected as at least one color of each light bar.

5. The computer-implemented method of claim 1, wherein each light bar further comprises two colors including a selected color and a default color.

6. The computer-implemented method of claim 1, wherein a default color for a light bar associated with an active tab is an active tab color, and wherein a default color for a light bar associated with a hidden tab is a hidden tab color.

7. The computer-implemented method of claim 1, wherein each light bar is configured to provide a persistent visual indicator of the tab replaced by each light bar.

8. The computer-implemented method of claim 1, wherein each light bar is configured to enable activation of the tab replaced by each light bar.

9. The computer-implemented method of claim 1, wherein the property includes a state of the web content associated with the tab replaced by each light bar.

10. A system comprising:
    one or more processors; and
    a machine-readable medium comprising instructions stored therein, which when executed by the one or more processors, cause the one or more processors to perform operations comprising:
        displaying a web browser including an active tab and one or more hidden tabs, the active tab and the one or more hidden tabs being associated with respective web content;
        receiving, from a user, an indication to enter an immersive mode for the web browser; and
        upon entering the immersive mode, displaying content for the active tab in full screen and a light bar in place of each of the active tab and the one or more hidden tabs, each light bar indicating a property of web content associated with a browsing tab, wherein each light bar comprises colored sections, one colored section is based on an icon associated with the browsing tab corresponding to each light bar, and another colored section is based on a state of the browsing tab corresponding to each light bar.

11. The system of claim 10, wherein the web browser in the immersive mode is displayed without the active tab and the one or more hidden tabs.

12. The system of claim 10, further comprising:
    displaying each light bar at a location corresponding to the browsing tab associated with each light bar.

13. The system of claim 12, further comprising:
    identifying an icon associated with the browsing tab corresponding to each light bar; and
    determining at least one dominant icon color for the icon, wherein the at least one dominant icon color for the icon is selected as at least one color of each light bar.

14. The system of claim 10, wherein each light bar comprises at least a selected color and a default color.

15. The system of claim 10, wherein the property includes a state of the web content associated with the browsing tab.

16. A non-transitory machine-readable medium comprising instructions stored therein, which when executed by a machine, cause the machine to perform operations comprising:
    displaying a web browser comprising an active tab and one or more hidden tabs;
    receiving an indication to enter a full-screen mode for the web browser; and
    upon entering the full-screen mode, displaying content for the active tab in full screen and a light bar in place of each of the active tab and the one or more hidden tabs, each light bar indicating a property of web content associated with a tab, wherein each light bar comprises colored sections, one colored section is based on an icon associated with the tab corresponding to each light bar, and another colored section is based on a state of the tab corresponding to each light bar.

17. The non-transitory machine-readable medium of claim 16, wherein web browser in the full-screen mode is displayed without the active tab and the one or more hidden tabs.

18. The non-transitory machine-readable medium of claim 16, wherein the displaying of each light bar comprises, for each light bar:
    displaying each light bar at a location corresponding to the tab associated with each light bar.

19. The non-transitory machine-readable medium of claim 16, wherein the property includes a state of the web content associated with the tab.

* * * * *